US012744156B2

(12) United States Patent
Hwang et al.

(10) Patent No.: US 12,744,156 B2
(45) Date of Patent: Sep. 22, 2026

(54) MULTILAYER ELECTRONIC COMPONENT

(71) Applicant: SAMSUNG ELECTRO-MECHANICS CO., LTD., Suwon-si (KR)

(72) Inventors: Jung Wun Hwang, Suwon-si (KR); Chae Dong Lee, Suwon-si (KR); Sun Kyoung Park, Suwon-si (KR); Ji Hye Oh, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 146 days.

(21) Appl. No.: 18/917,139

(22) Filed: Oct. 16, 2024

(65) Prior Publication Data

US 2025/0166897 A1 May 22, 2025

(30) Foreign Application Priority Data

Nov. 21, 2023 (KR) ........................ 10-2023-0162334

(51) Int. Cl.
*H01G 4/005* (2006.01)
*H01G 4/12* (2006.01)
(Continued)

(52) U.S. Cl.
CPC ........... *H01G 4/005* (2013.01); *H01G 4/1227* (2013.01); *H01G 4/224* (2013.01); *H01G 4/228* (2013.01); *H01G 4/30* (2013.01)

(58) Field of Classification Search
CPC ...... H01G 4/005; H01G 4/1227; H01G 4/224; H01G 4/228; H01G 4/30; H01G 4/0085; H01G 4/232; H01G 4/012; Y02E 60/01
See application file for complete search history.

(56) References Cited

U.S. PATENT DOCUMENTS 10,475,582 B2 11/2019 Hong et al.
10,840,024 B2 * 11/2020 Lee ........................ H01G 4/008
(Continued)

FOREIGN PATENT DOCUMENTS

JP 9-270360 A 10/1997
JP 2000-311830 A 11/2000
(Continued)

OTHER PUBLICATIONS

Translation of JP ’127 (Year: 2002).*
Extended European Search Report dated Apr. 1, 2025 in corresponding European Patent Application No. 24206887.2.

*Primary Examiner* — Dion R. Ferguson
(74) *Attorney, Agent, or Firm* — Morgan, Lewis & Bockius LLP

(57) ABSTRACT

A multilayer electronic component includes a body including a dielectric layer and first to fourth internal electrode layers disposed alternately in a first direction with the dielectric layer interposed therebetween; and first and second external electrodes disposed on the third and fourth surfaces respectively, wherein the internal electrode layer includes an internal electrode and a dummy electrode spaced apart from each other with a spacing portion therebetween, and at least two of the spacing portions may include regions overlapping each other in the first direction and other regions do not overlapping each other.

16 Claims, 7 Drawing Sheets

(51) Int. Cl.

| | |
|---|---|
| ***H01G 4/224*** | (2006.01) |
| ***H01G 4/228*** | (2006.01) |
| ***H01G 4/30*** | (2006.01) |

(56) References Cited

U.S. PATENT DOCUMENTS

| | | | | |
|---|---|---|---|---|
| 10,854,391 | B2 * | 12/2020 | Kim | H01G 4/232 |
| 11,657,966 | B2 * | 5/2023 | Kim | H01G 4/30 361/301.4 |
| 11,776,743 | B2 | 10/2023 | Kim et al. | |
| 2010/0002356 | A1 | 1/2010 | Yoshida et al. | |
| 2013/0241361 | A1 * | 9/2013 | Lee | H01G 4/012 336/200 |
| 2014/0016241 | A1 | 1/2014 | Hoshi et al. | |
| 2014/0240895 | A1 * | 8/2014 | Lee | H01G 4/12 29/25.42 |
| 2019/0148073 | A1 * | 5/2019 | Lee | H01G 4/008 361/306.3 |
| 2020/0043663 | A1 * | 2/2020 | Kim | H01G 4/012 |
| 2022/0084752 | A1 | 3/2022 | Kato | |
| 2023/0020333 | A1 | 1/2023 | Shimada | |
| 2025/0166897 | A1 * | 5/2025 | Hwang | H01G 4/228 |
| 2025/0210258 | A1 * | 6/2025 | Hwang | H01G 4/232 |

FOREIGN PATENT DOCUMENTS

| | | | |
|---|---|---|---|
| JP | 2002305127 | A * | 10/2002 |
| KR | 10-2020-0014478 | A | 2/2020 |
| KR | 10-2022-0098507 | A | 7/2022 |

* cited by examiner

111
II
II '
I
I '
121a
121b
141
THIRD DIRECTION
SECOND DIRECTION 111
122b
122a
142

111
123a
123b
143

144
111
124b
124a

111
II
II '
I
I '
221a
221b
THIRD DIRECTION
SECOND DIRECTION
241

111
II
II '
I
I '
222b
222a
THIRD DIRECTION
SECOND DIRECTION
242

111
II
II '
I
I '
223a
223b
THIRD DIRECTION
SECOND DIRECTION
243

244
111
II
II '
I
I '
224b
224a
THIRD DIRECTION
SECOND DIRECTION

MULTILAYER ELECTRONIC COMPONENT

CROSS-REFERENCE TO RELATED APPLICATION(S)

This application claims benefit of priority to Korean Patent Application No. 10-2023-0162334 filed on Nov. 21, 2023 in the Korean Intellectual Property Office, the disclosure of which is incorporated herein by reference in its entirety.

BACKGROUND

1. Technical Field

The present disclosure relates to a multilayer electronic component.

2. Description of Related Art

A multilayer ceramic capacitor (MLCC), a multilayer electronic component, may be a chip condenser mounted on the printed circuit boards of various electronic products including image display devices such as a liquid crystal display (LCD) and a plasma display panel (PDP), a computer, a smartphone, a mobile phone, or the like, charging or discharging electricity therein or therefrom.

Such a multilayer ceramic capacitor may be used as a component of various electronic devices since a multilayer ceramic capacitor may have a small size and high capacitance and may be easily mounted. As various electronic devices such as a computer and a mobile device have been designed to have a smaller size and higher output, the demand for miniaturization and increased capacitance of multilayer ceramic capacitors has increased.

A body, a component of a multilayer ceramic capacitor, may mainly include a ceramic material, which is a brittle material, and may be vulnerable to tensile stress. Accordingly, depending on a manufacturing process or usage environment, the body may not be able to withstand stress applied from the outside and cracks may be created in the body, which may shorten the lifespan.

SUMMARY

An embodiment of the present disclosure is to provide a multilayer electronic component having improved warpage strength.

According to an embodiment of the present disclosure, a multilayer electronic component includes a body including a dielectric layer and first to fourth internal electrode layers disposed alternately in a first direction with the dielectric layer interposed therebetween, the body including first and second surfaces opposing each other in the first direction, third and fourth surfaces connected to the first and second surfaces and opposing each other in a second direction, and fifth and sixth surfaces connected to the first to fourth surfaces and opposing each other in a third direction; and first and second external electrodes disposed on the third and fourth surfaces respectively, wherein the first internal electrode layer includes a first internal electrode, and a first dummy electrode spaced apart from the first internal electrode with a first spacing portion therebetween, the second internal electrode layer includes a second internal electrode, and a second dummy electrode spaced apart from the second internal electrode with a second spacing portion therebetween, the third internal electrode layer includes a third internal electrode, and a third dummy electrode spaced apart from the third internal electrode with a third spacing portion therebetween, and the fourth internal electrode layer includes a fourth internal electrode, and a fourth dummy electrode spaced apart from the fourth internal electrode with the fourth spacing portion therebetween, wherein the first external electrode is connected to the first internal electrode, the third internal electrode, the second dummy electrode and the fourth dummy electrode, and the second external electrode is connected to the second internal electrode, the fourth internal electrode, the first dummy electrode, and the third dummy electrode, and wherein the first spacing portion includes a region overlapping the third spacing portion in the first direction and a region not overlapping the third spacing portion, and the second spacing portion includes a region overlapping the fourth spacing portion in the first direction and a region not overlapping the fourth spacing portion.

BRIEF DESCRIPTION OF DRAWINGS

The and other aspects, features, and advantages of the present disclosure will be more clearly understood from the following detailed description, taken in combination with the accompanying drawings, in which.

DETAILED DESCRIPTION

Figure 1:
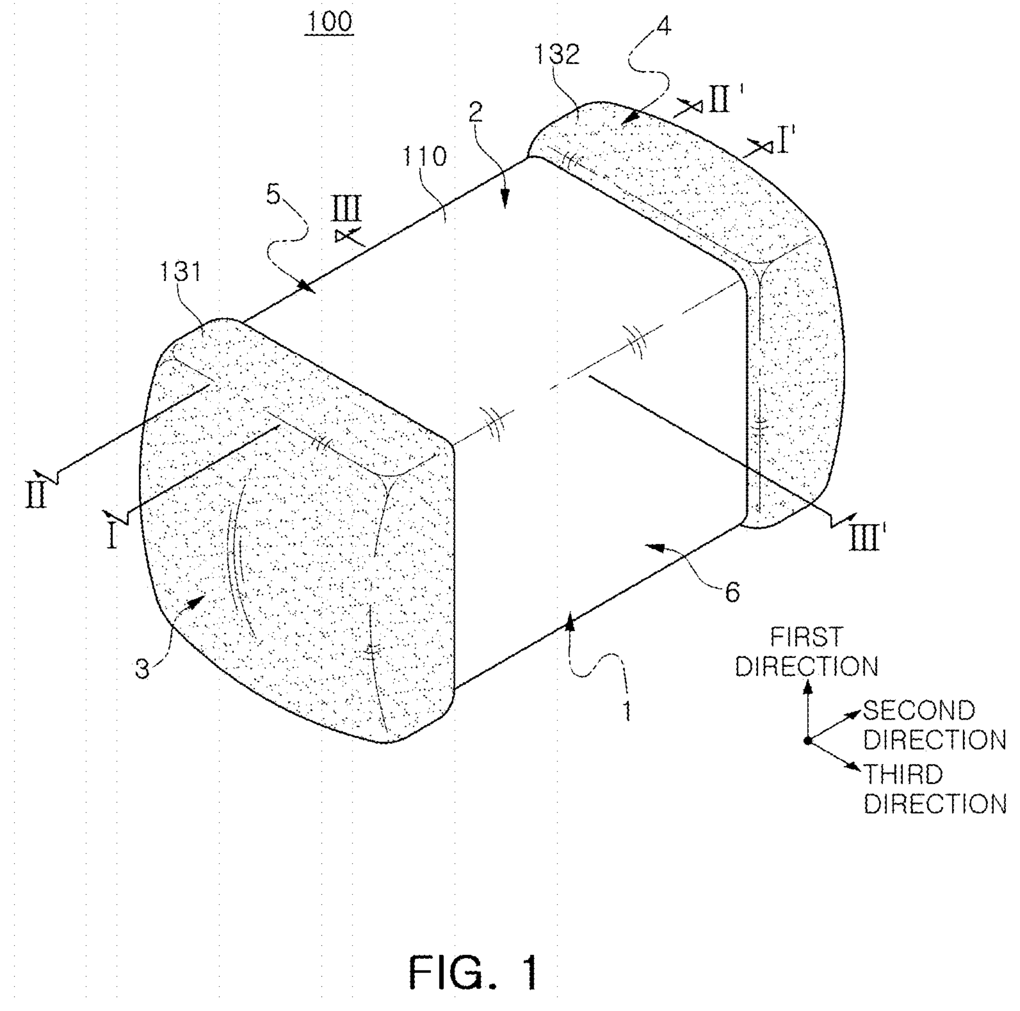
FIG. 1 is a perspective diagram illustrating a multilayer electronic component according to an embodiment of the present disclosure.
Figures 2A, 2B, 2C, 2D:
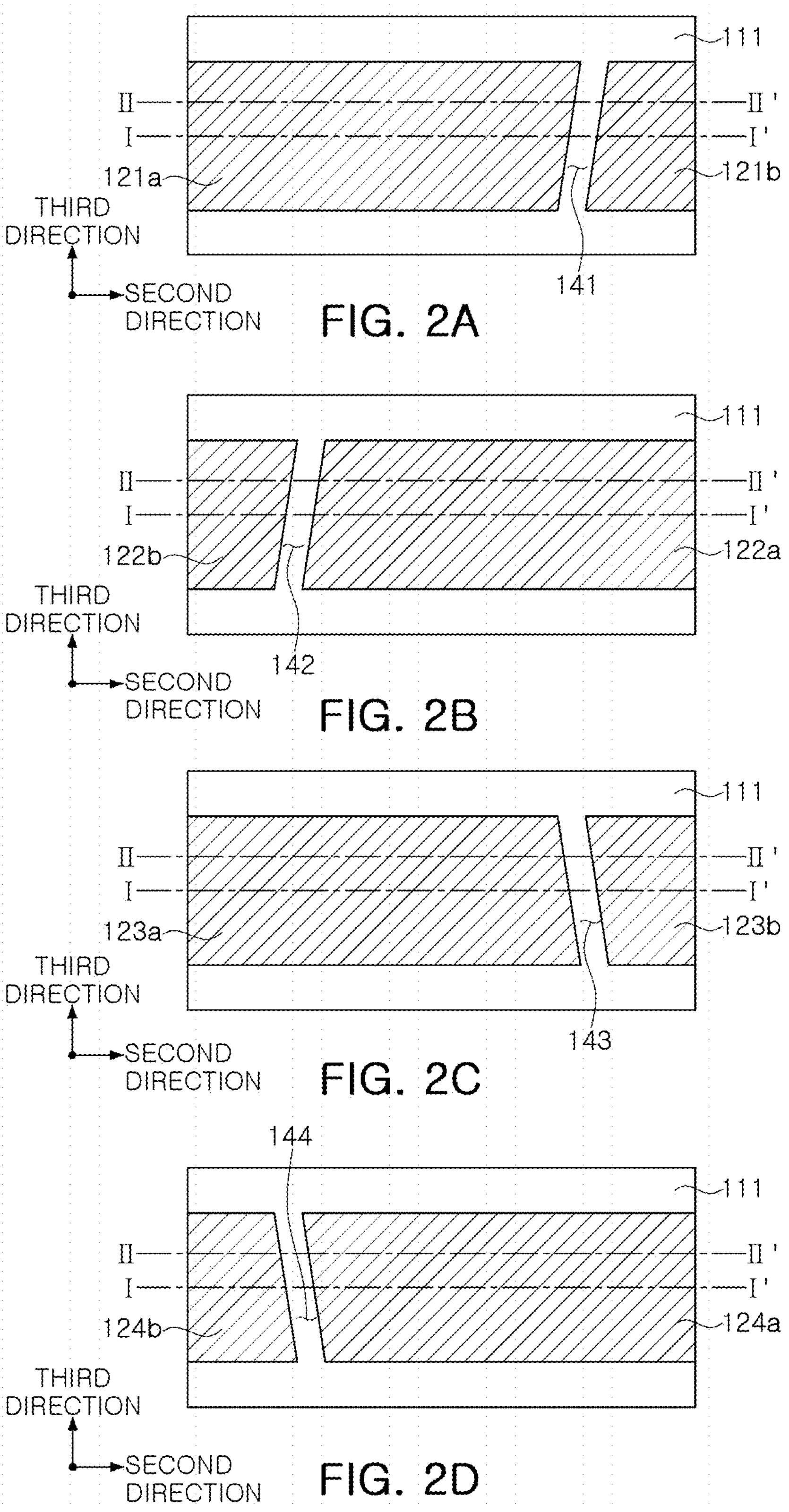
FIGS. 2A to 2D are cross-sectional diagrams illustrating internal electrode layers according to an embodiment of the present disclosure.
Figures 3A, 3B, 3C, 3D:
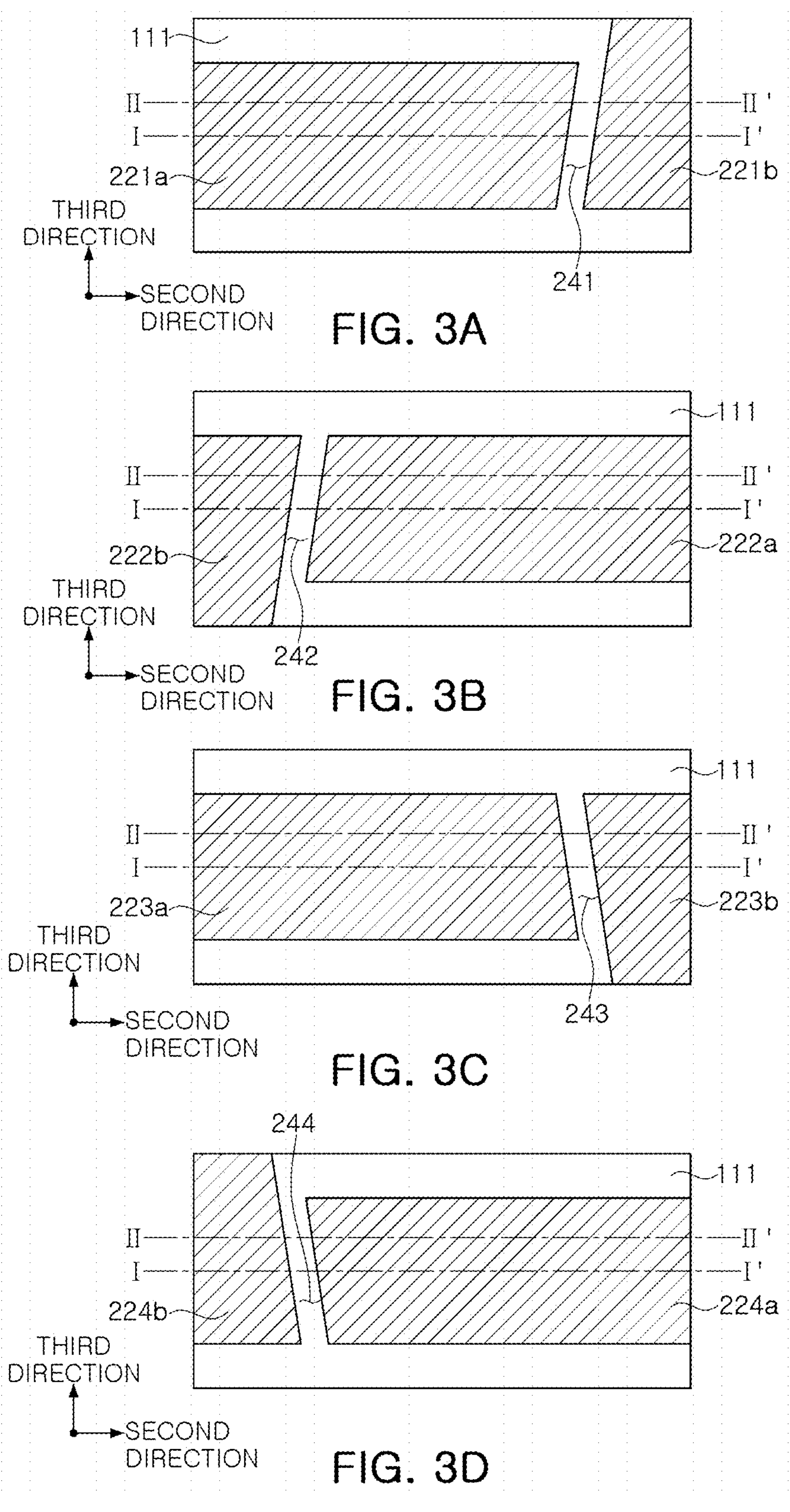
FIGS. 3A to 3D are cross-sectional diagrams illustrating internal electrode layers according to another embodiment of the present disclosure.

Hereinafter, embodiments of the present disclosure will be described as below with reference to the accompanying drawings.

These embodiments are described in sufficient detail to enable those skilled in the art to practice the disclosure. It is to be understood that the various embodiments of the disclosure, although different, are not necessarily mutually exclusive. For example, structures, shapes, and sizes described as examples in embodiments in the present disclosure may be implemented in another embodiment without departing from the spirit and scope of the present disclosure. Further, modifications of positions or arrangements of elements in embodiments may be made without departing from the spirit and scope of the present disclosure. The following detailed description is, accordingly, not to be taken in a limiting sense, and the scope of the present disclosure are defined only by appended claims, appropriately interpreted, along with the full range of equivalents to which the claims are entitled.

In the drawings, same elements will be indicated by same reference numerals. Also, redundant descriptions and detailed descriptions of known functions and elements which may unnecessarily make the gist of the present disclosure obscure will be omitted. In the accompanying drawings, some elements may be exaggerated, omitted or briefly illustrated, and the sizes of the elements do not necessarily reflect the actual sizes of these elements. The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

As used herein, the expression "substantially the same" may refer to a parameter having the same numerical value as another parameter compared therewith, as will be appreciated by those of skill in the art, and allows for approximations, inaccuracies and limits of measurement under the relevant circumstances. The term "substantially" may provide an industry-accepted tolerance for the corresponding terms and/or relativity between items, such as a tolerance of ±1%, ±5%, or ±10% of the actual value stated, and other suitable tolerances, unless otherwise noted.

In the drawings, the first direction may be defined as a lamination direction or a thickness (T) direction, the second direction may be defined as a length (L) direction, and the third direction may be defined as a width (W) direction.

Multilayer Electronic Component

FIG. 1 is a perspective diagram illustrating a multilayer electronic component according to an embodiment.

FIGS. 2A to 2D are cross-sectional diagrams illustrating internal electrode layers according to an embodiment.

FIGS. 3A to 3D are cross-sectional diagrams illustrating internal electrode layers according to another embodiment.

Figure 4:
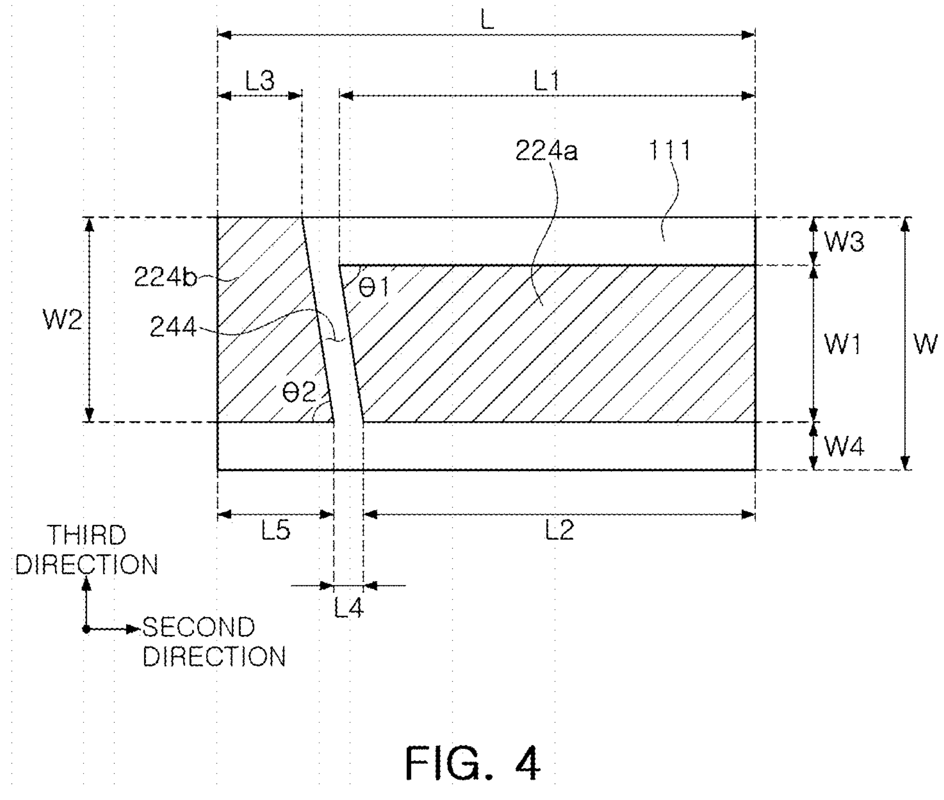
FIG. 4 is a cross-sectional diagram illustrating an internal electrode layer according to another embodiment of the present disclosure.

FIG. 4 is a cross-sectional diagram illustrating an internal electrode layer according to another embodiment.

Figure 5:
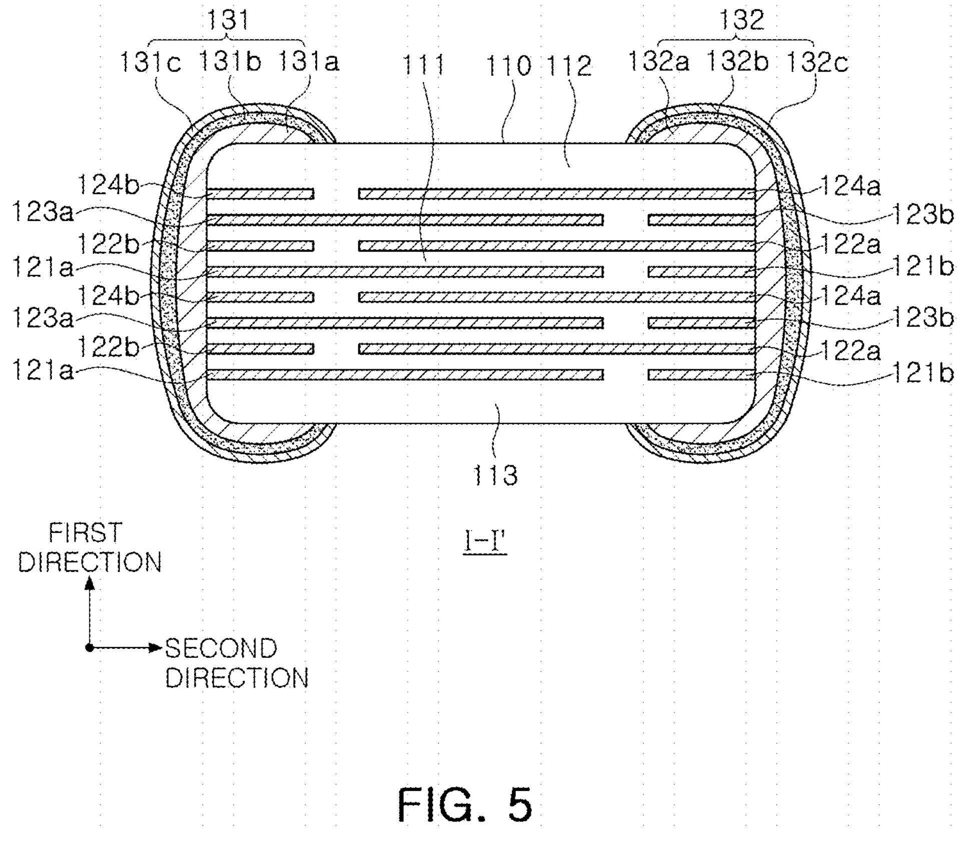
FIG. 5 is a cross-sectional diagram taken along line I-I' in FIG. 1.

FIG. 5 is a cross-sectional diagram taken along line I-I' in FIG. 1.

Figure 6:
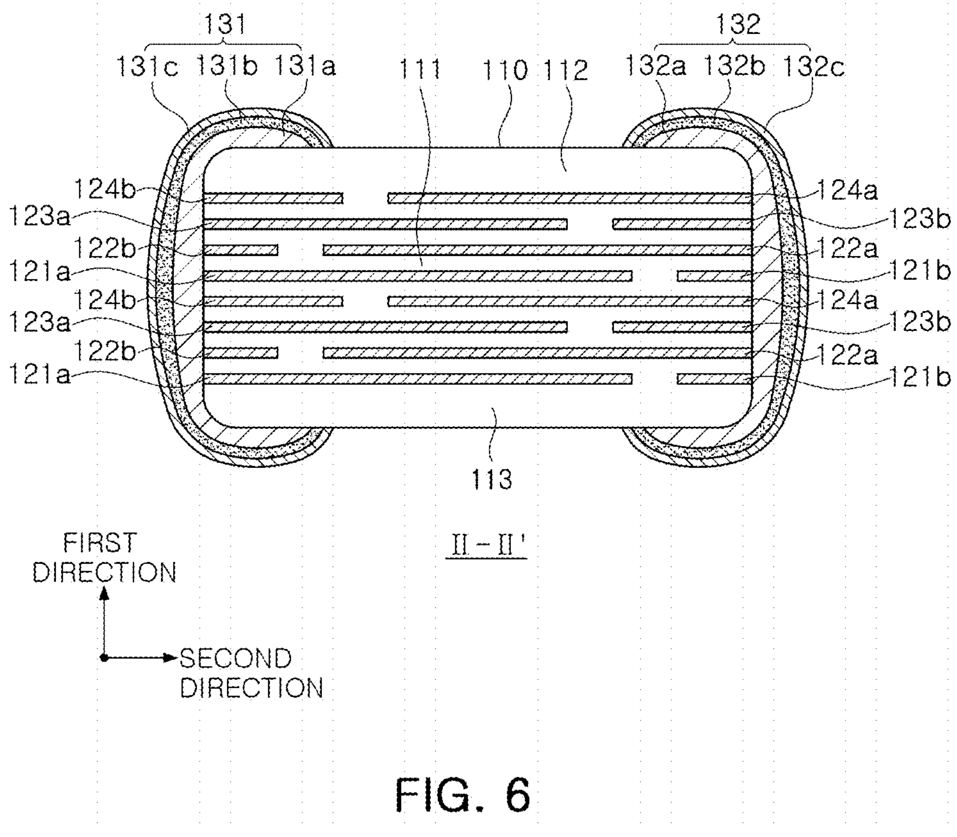
FIG. 6 is a cross-sectional diagram taken along line II-II' in FIG. 1.

FIG. 6 is a cross-sectional diagram taken along line II-II' in FIG. 1.

Figure 7:
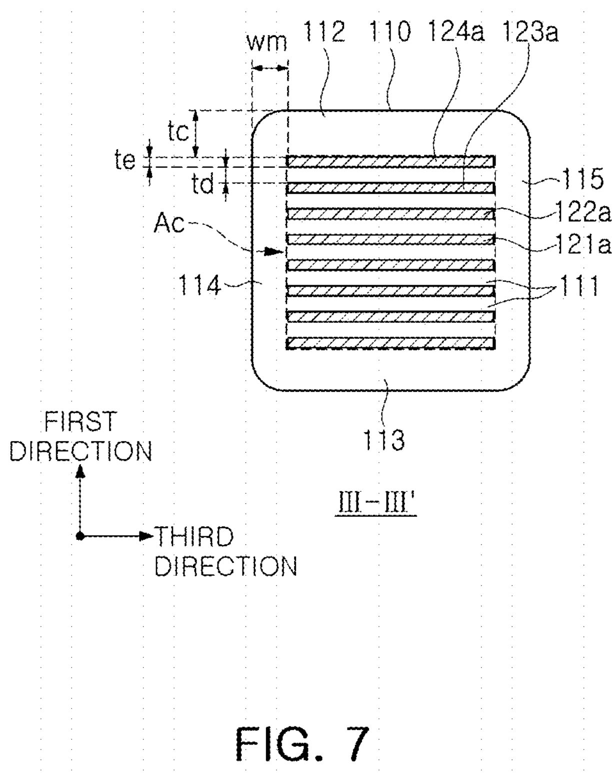
FIG. 7 is a cross-sectional diagram taken along line III-III' in FIG. 1.

FIG. 7 is a cross-sectional diagram taken along line III-III' in FIG. 1.

Hereinafter, a multilayer electronic component according to an embodiment will be described in greater detail with reference to FIGS. 1 to 7. A multilayer ceramic capacitor will be described as an example of a multilayer electronic component, but an embodiment thereof is not limited thereto, and the multilayer ceramic capacitor may be applied to various multilayer electronic components, such as an inductor, a piezoelectric element, a varistor, or a thermistor.

A multilayer electronic component 100 according to an embodiment may include a body including a dielectric layer 111 and first to fourth internal electrode layers 121, 122, 123, and 124 disposed alternately in the first direction with the dielectric layer 111 interposed therebetween, and including first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3, and 4 and opposing each other in the third direction, and first and second external electrodes 131 and 132 disposed on the third and fourth surfaces respectively, wherein the first internal electrode layer 121 may include a first internal electrode 121*a*, and a first dummy electrode 121*b* spaced apart from the first internal electrode 121*a* with a first spacing portion 141 therebetween, the second internal electrode layer 122 may include a second internal electrode 122*a*, and a second dummy electrode 122*b* spaced apart from the second internal electrode 122*a* with a second spacing portion 142 therebetween, the third internal electrode layer 123 may include a third internal electrode 123*a*, and a third dummy electrode 123*b* spaced apart from the third internal electrode 123*a* with a third spacing portion 143 therebetween, and the fourth internal electrode layer 124 may include a fourth internal electrode 124*a*, and a fourth dummy electrode 124*b* spaced apart from the fourth internal electrode 124*a* with the fourth spacing portion 144 therebetween, the first external electrode 131 is connected to the first internal electrode 121*a*, the third internal electrode 123*a*, the second dummy electrode 122*b* and the fourth dummy electrode 124*b*, and the second external electrode 124 is connected to the second internal electrode 122*a*, the fourth internal electrode 124*a*, the first dummy electrode 121*b*, and the third dummy electrode 123*b*, and the first spacing portion 141 may include a region overlapping the third spacing portion 143 in the first direction and a region not overlapping the third spacing portion 143, and the second spacing portion 142 may include a region overlapping the fourth spacing portion 144 in the first direction and a region not overlapping the fourth spacing portion 144.

The body 110 may have the dielectric layers 111 and internal electrode layers 121, 122, 123, and 124, which may be alternately laminated.

More specifically, the body 110 may include the first to fourth internal electrode layers 121, 122, 123, and 124 disposed in the body 110 and alternately disposed with the dielectric layer 111 therebetween.

The shape of the body 110 may not be limited to any particular shape, but as illustrated, the body 110 may have a hexahedral shape or a shape similar to a hexahedral shape. Due to reduction of ceramic powder included in the body 110 during a firing process, the body 110 may not have an exactly hexahedral shape formed by linear lines but may have a substantially hexahedral shape.

The body 110 may have the first and second surfaces 1 and 2 opposing each other in the first direction, the third and fourth surfaces 3 and 4 connected to the first and second surfaces 1 and 2 and opposing in the second direction, and the fifth and sixth surfaces 5 and 6 connected to the first to fourth surfaces 1, 2, 3, and 4 and opposing each other in the third direction.

The plurality of dielectric layers 111 forming the body 110 may be in a fired state, and a boundary between the adjacent dielectric layers 111 may be integrated with each other such that the boundary may not be distinct without using a scanning electron microscope (SEM).

The raw material forming the dielectric layer 111 is not limited as long as sufficient capacitance may be obtained therewith, and generally, a perovskite ($ABO_3$) material may be used, and for example, a barium titanate material, a lead composite perovskite material, or a strontium titanate material may be used. A barium titanate material may include $BaTiO_3$ ceramic particles, and an example of the ceramic powder may include $BaTiO_3$, $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$ or $Ba(Ti_{1-y}Zr_y)O_3$ $(0<y<1)$ in which Ca (calcium) and Zr (zirconium) are partially dissolved.

Also, as a raw material for forming the dielectric layer 111, various ceramic additives, organic solvents, binders, and dispersants may be added to particles such as barium titanate ($BaTiO_3$) depending on the purpose of the embodiment.

A thickness td of the dielectric layer 111 may not be limited to any particular example.

However, to ensure reliability of the multilayer electronic component 100 in a high voltage environment, the thickness of the dielectric layer 111 may be 10.0 μm or less. Also, to implement miniaturization and high capacitance of the multilayer electronic component 100, the thickness of the dielectric layer 111 may be 3.0 μm or less. To easily implement ultra-miniaturization and high capacitance, the thickness of the dielectric layer 111 may be 1.0 μm or less, preferably 0.6 μm or less, and more preferably 0.4 μm or less.

Here, the thickness td of dielectric layer 111 may indicate the thickness td of at least one of the plurality of dielectric layer 111.

The thickness td of the dielectric layer 111 may refer to the size, in the first direction, of the dielectric layer 111. Also, the thickness td of the dielectric layer 111 may refer to the average thickness td of the dielectric layer 111 and may refer to the average size, in the first direction, of the dielectric layer 111.

The average size, in the first direction, of the dielectric layer 111 may be measured by scanning a cross-section in the first and second directions of the body 110 using a scanning electron microscope (SEM) with a magnification of 10,000. More specifically, the average size, in the first direction, of the dielectric layer 111 may indicate the average value calculated by measuring the sizes in the first direction of the dielectric layer 111 at 10 points at an equal distance in the second direction in the scanned image. The 10 points at an equal distance may be specified in the capacitance formation portion Ac. Also, by extending the measurement of the average value to 10 dielectric layers 111, the average size, in the first direction, of the dielectric layer 111 may be further generalized.

The internal electrode layers 121, 122, 123, and 124 may be laminated alternately with the dielectric layer 111.

The internal electrode layers 121, 122, 123, and 124 may include internal electrodes 121*a*, 122*a*, 123*a*, and 124*a*, and dummy electrodes 121*b*, 122*b*, 123*b*, and 124*b* spaced apart from the internal electrodes 121*a*, 122*a*, 123*a*, and 124*a* with spacing portions 141, 142, 143, and 144 therebetween and not forming capacitance.

In the embodiments, unless otherwise indicated, the description of the internal electrode layers 121, 122, 123, and 124 may include the descriptions of the internal electrodes 121*a*, 122*a*, 123*a*, and 124*a* and the dummy electrodes 121*b*, 122*b*, 123*b*, and 124*b*.

More specifically, the first internal electrode layer 121 may include the first internal electrode 121*a*, and the first dummy electrode 121*b* spaced apart from the first internal electrode 121*a* with the first spacing portion 141, the second internal electrode layer 122 may include the second internal electrode 122*a*, and the second dummy electrode 122*b* spaced apart from the second internal electrode 122*a* with the second spacing portion 142, the third internal electrode layer 123 may include the third internal electrode 123*a*, and the third dummy electrode 123*b* spaced apart from the third internal electrode 123*a* with the third spacing portion 143, and the fourth internal electrode layer 124 may include the fourth internal electrode 124*a*, and the fourth dummy electrode 124*b* spaced apart from the fourth internal electrode 124*a* with the fourth spacing portion 144.

In other words, the internal electrodes 121*a*, 122*a*, 123*a*, and 124*a* and the dummy electrodes 121*b*, 122*b*, 123*b*, and 124*b* may be electrically insulated. More specifically, the first internal electrode 121*a* may be electrically insulated from the first dummy electrode 121*b*, the second internal electrode 122*a* may be electrically insulated from the second dummy electrode 122*b*, the third internal electrode 123*a* may be electrically insulated from the third dummy electrode 123*b*, and the fourth internal electrode 124*a* may be electrically insulated from the fourth dummy electrode 124*b*.

More specifically, the first internal electrode 121*a* may be spaced apart from the fourth surface 4 and may be exposed through the third surface 3, the second internal electrode 122*a* may be spaced apart from the third surface 3 and may be exposed through the fourth surface 4, the third internal electrode 123*a* may be spaced apart from the fourth surface 4 and may be exposed through the third surface 3, and the fourth internal electrode 124*a* may be spaced apart from the third surface 3 and may be exposed through the fourth surface 4.

Also, the first dummy electrode 121*b* may be spaced apart from the third surface 3 and may be exposed through the fourth surface 4, the second dummy electrode 122*b* may be spaced apart from the fourth surface 4 and may be exposed through the third surface 3, the third dummy electrode 123*b* may be spaced apart from the third surface 3 and may be exposed through the fourth surface 4, and the fourth dummy electrode 124*b* may be spaced apart from the fourth surface 4 and may be exposed through the third surface 3.

The first spacing portion 141 may refer to a region between the first internal electrode 121*a* and the first dummy electrode 121*b*, spaced apart from the third and fourth surfaces 3 and 4, and spaced apart from each other in the second direction, the second spacing portion 142 may indicate a region between the second internal electrode 122*a* and the second dummy electrode 122*b*, spaced apart from third and fourth surfaces 3 and 4, and spaced apart from each other in the second direction, the third spacing portion 143 may indicate a region between the third internal electrode 123*a* and the third dummy electrode 123*b*, spaced apart from third and fourth surfaces 3 and 4, and spaced apart from each other in the second direction, and the fourth spacing portion 144 may indicate a region between the fourth internal electrode 124*a* and the fourth dummy electrode 124*b*, spaced apart from third and fourth surfaces 3 and 4, and spaced apart from each other in the second direction.

In this case, the first spacing portion 141 may include a region overlapping the third spacing portion 143 in the first direction and a region not overlapping the third spacing portion 143, and the second spacing portion 142 may include a region overlapping the fourth spacing portion 144 in the first direction and a region not overlapping the fourth spacing portion 144.

The first spacing portion 141 and the third spacing portion 143 may be alternately disposed to include the region in which the portions overlap each other and the region in which the portions do not overlap each other, and the second spacing portion 142 and the fourth spacing portion 144 may be alternately disposed to include the region in which the portions overlap each other and the region in which the portions do not overlap each other, such that, even when warpage stress is applied to the body 110, the formation of cracks may be effectively prevented.

In other words, when the first spacing portion 141 and the third spacing portion 143 are alternately disposed to include the region in which the portions overlap each other and the region in which the portions do not overlap each other in the first direction, and the second spacing portion 142 and the fourth spacing portion 144 are alternately disposed to include the region in which the portions overlap each other and the region in which the portions do not overlap each other in the first direction, when warpage stress is applied to the multilayer electronic component 100 including the body 110 in the first direction, the region in which the spacing portions 141, 142, 143, and 144 in which the internal electrodes 121*a*, 122*a*, 123*a*, and 124*a* and the dummy electrodes 121*b*, 122*b*, 123*b*, and 124*b* are not disposed with respect to the first direction may be reduced, such that cracks may be prevented and mechanical properties of multilayer electronic component 100 may improve.

For example, each of the first to fourth spacing portions 141, 142, 143, and 144 may have a substantially parallelogrammatic shape, and the first and third spacing portions 141, 143 having the parallelogrammatic shape may be disposed to intersect each other in the first direction, and the second and fourth spacing portions 142 and 144 having the parallelogrammatic shape may be disposed to intersect each other in the first direction.

As used herein, the term "substantially parallelogrammatic shape" refers to a four-sided shape where opposing sides are parallel to each other or substantially parallel to each other. As used herein, the term "substantially parallel" describes opposing sides that intersect each other at an angle of 1° or less.

In some embodiments, each of the first to fourth spacing portions may be oblique to the fifth surface.

The first to fourth internal electrodes 121*a*, 122*a*, 123*a*, and 124*a* may include first and second sides opposing each other in the third direction, and lengths of the first and second sides of first to fourth internal electrodes 121*a*, 122*a*, 123*a*, and 124*a* may be different.

In other words, when the lengths of one side and the other side opposing each other in the third direction of the internal electrode are defined as L1 and L2, respectively, L1 and L2 may not be the same.

More specifically, the first internal electrode 121*a* may include a first side adjacent to the fifth surface 5 and a second side adjacent to the sixth surface 6, and a size, in the second direction, of the first side of the first internal electrode 121*a* may be larger than a size, in the second direction, of the second side of the internal electrode 121*a*. The second internal electrode 122*a* may include a first side adjacent to the fifth surface 5 and a second side adjacent to the sixth surface 6, and a size, in the second direction, of the second side of the second internal electrode 122*a* may be larger than the size, in the second direction, of the first side of the second internal electrode 122*a*. The third internal electrode 123*a* may include a first side adjacent to the fifth surface 5 and a second side adjacent to the sixth surface 6, and a size, in the second direction, of the second side of the third internal electrode 123*a* may be larger than the size, in the second direction, of the first side of the third internal electrode 123*a*. The fourth internal electrode 124*a* may include a first side adjacent to the fifth surface 5 and a second side adjacent to the sixth surface 6, and the size, in the second direction, of the first side of the fourth internal electrode 124*a* may be larger than the size, in the second direction, of the second side of the fourth internal electrode 124*a*.

Also, the first to fourth dummy electrodes 121*b*, 122*b*, 123*b*, and 124*b* may include first and second sides opposing each other in the third direction, and the lengths of the first and second sides of the first to fourth dummy electrodes 121*b*, 122*b*, 123*b*, and 124*b* may be different.

In other words, when the lengths of one side and the other side opposing each other in the third direction of the dummy electrode are defined as L3 and L5, respectively, L3 and L5 may not be the same.

More specifically, the first dummy electrode 121*b* may include a first side adjacent to the fifth surface 5 and a second side adjacent to the sixth surface 6, and a size, in the second direction, of the second side of the first dummy electrode 121*b* may be larger than the size, in the second direction, of the first side of the first dummy electrode 121*b*. The second dummy electrode 122*b* may include a first side adjacent to the fifth surface 5 and a second side adjacent to the sixth surface 6, and a size, in the second direction, of the first side of the second dummy electrode 122*b* may be larger than the size, in the second direction, of the second side of second dummy electrode 122*b*. The third dummy electrode 123*b* may include a first side adjacent to the fifth surface 5 and a second side adjacent to the sixth surface 6, and a size, in the second direction, of the first side of the third dummy electrode 123*b* may be larger than the size, in the second direction, of the second side of the third dummy electrode 123*b*. The fourth dummy electrode 124*d* may include a second side adjacent to the fifth surface 5 and a first side adjacent to the sixth surface 6, and the size, in the second direction, of the second side of the fourth dummy electrode 124*b* may be larger than the size, in the second direction, of the first side of the fourth dummy electrode 124*b*.

As the lengths of the first and second sides of the first to fourth internal electrodes 121*a*, 122*a*, 123*a*, and 124*a* are different, and the lengths of the first and second sides of the first to fourth dummy electrodes 121*b*, 122*b*, 123*b*, and 124*b* are different, warpage stress of the multilayer electronic components may be further improved.

Meanwhile, the average sizes, in the second direction, of the first to fourth internal electrodes 121*a*, 122*a*, 123*a*, and 124*a* may be larger than the average sizes, in the second direction, of the first to fourth dummy electrodes 121*b*, 122*b*, 123*b*, and 124*b*, respectively.

As the average sizes, in the second direction, of the first to fourth internal electrodes 121*a*, 122*a*, 123*a*, and 124*a* are larger than the average sizes, in the second direction, of the first to fourth dummy electrodes 121*b*, 122*b*, 123*b*, and 124*b*, sufficient capacitance may be formed and sufficient warpage strength may be secured.

The average sizes, in the second direction, of the first to fourth internal electrodes 121*a*, 122*a*, 123*a*, and 124*a* may be measured using a scanning electron microscope (SEM) and measuring the sizes, in the second direction, in centers of the third direction of the first to fourth internal electrodes 121*a*, 122*a*, 123*a*, and 124*a*, respectively, measuring the sizes, in the second direction, at points spaced apart from each other in a direction from the centers in the third direction to both sides in the third direction and calculating an average of the sizes, in the second direction. Other methods and/or tools appreciated by one of ordinary skill in the art, even if not described in the present disclosure, may also be used.

Similarly, the average sizes, in the second direction, of the first to fourth dummy electrodes 121*b*, 122*b*, 123*b*, and 124*b* may be measured using a scanning electron microscope (SEM) and measuring the sizes, in the second direction, in centers of the third direction of the first to fourth dummy electrodes 121*b*, 122*b*, 123*b*, and 124*b*, respectively, measuring the sizes, in the second direction, at points spaced apart from each other in a direction from the centers in the third direction to both sides in the third direction and calculating an average of the sizes, in the second direction.

Other methods and/or tools appreciated by one of ordinary skill in the art, even if not described in the present disclosure, may also be used.

The size, in the second direction, of each of the first to fourth spacing portions 141, 142, 143, and 144 may be substantially constant. For example, the difference between the largest value and the smallest value for each of the size of the first to fourth spacing portions 141, 142, 143, and 144 in the second direction may be less than 5%.

As the size, in the second direction, of each of the first to fourth spacing portions 141, 142, 143, and 144 is substantially constant, warpage stress applied in the first direction may be properly absorbed such that warpage strength of the multilayer electronic component may be improved.

The size and average size, in the second direction, of each of the first to fourth spacing portions 141, 142, 143, and 144 may be measured using a scanning electron microscope (SEM). The average size may be obtained by measuring the sizes, in the second direction, in centers of the third direction of the first to fourth spacing portions 141, 142, 143, and 144, respectively, measuring the sizes, in the second direction, at points spaced apart from each other in a direction from the centers in the third direction to both sides in the third direction and calculating an average of the sizes, in the second direction. Other methods and/or tools appreciated by one of ordinary skill in the art, even if not described in the present disclosure, may also be used.

To be described in greater detail with reference to FIGS. 5 and 6 as an example, in the cross-sectional diagram taken in I-I' corresponding to the cross-section in the first and second direction in the center in the third direction of the multilayer electronic component 100, the first and third spacing portions 141, 143 may overlap each other in the first direction, and the second and fourth spacing portions 142, 144 may overlap each other in the first direction. Also, in the cross-sectional diagram taken in II-II' corresponding to the cross-section in the first and second direction, spaced apart from the center in the third direction of the multilayer electronic component 100 in the third direction, the first and third spacing portions 141 and 143 may not overlap each other in the first direction, and the second and fourth spacing portions 142 and 144 may not overlap each other in the first direction.

Accordingly, even when the multilayer electronic component 100 is mounted on a substrate and warpage stress is applied in the first direction, the adjacent region in the first direction of the spacing portions 141, 142, 143, and 144 in which the internal electrode layers 121, 122, 123, and 124 are not disposed may include the region in which the other internal electrode layers 121, 122, 123, and 124 are disposed, warpage stress may be improved.

Also, the first to fourth internal electrodes 121*a*, 122*a*, 123*a*, and 124*a* may be spaced apart from the fifth and sixth surfaces 5 and 6.

More specifically, the first to fourth internal electrodes 121*a*, 122*a*, 123*a*, and 124*a* may be spaced apart from the fifth surface 5 by W3 in the third direction, and the first to fourth internal electrodes 121*a*, 122*a*, 123*a*, and 124*a* may be spaced apart from the sixth surface 5 by W4 in the third direction.

Here, the region spaced apart by W3 may be referred to as the first side margin region, and the region spaced apart by W4 may be referred to as the second side margin region. W3 and W4 will be described later.

Also, the first to fourth dummy electrodes 121*b*, 122*b*, 123*b*, and 124*b* may be spaced apart from the fifth and sixth surfaces 5 and 6. However, an embodiment thereof is not limited thereto, and the first to fourth dummy electrodes 221*b*, 222*b*, 223*b*, and 224*b* may be disposed in contact with a portion of the fifth and sixth surfaces 5 and 6, and accordingly, the first to fourth dummy electrodes may be spaced apart from at least one of the fifth and sixth surfaces 5 and 6.

More specifically, the first dummy electrode 221*b* may be in contact with a portion of the fifth surface 5 and may be spaced apart from the sixth surface 6, the second dummy electrode 222*b* may be spaced apart from the fifth surface 5 and may be in contact with a portion of the sixth surface 6, the third dummy electrode 223*b* may be spaced apart from the fifth surface 5 and may be in contact with a portion of the sixth surface 6, and the fourth dummy electrode 224*b* may be in contact with a portion of the fifth surface 5 and may be spaced apart from the sixth surface 6.

The first external electrode 131 may be disposed on the third surface 3 of the body 110 and may be connected to the first internal electrode 121*a*, the third internal electrode 123*a*, the second dummy electrode 122*b* and the fourth dummy electrode 124*b*, and the second external electrode 132 may be disposed on the fourth surface 4 of the body 110 and may be connected to the second internal electrode 122*a*, the fourth internal electrode 124*a*, the first dummy electrode 121*b*, and the third dummy electrode 123*b*.

That is, the first internal electrode 121*a*, the third internal electrode 123*a*, the second dummy electrode 122*b* and the fourth dummy electrode 124*b* may not be connected to the second external electrode 132 and may be connected to the first external electrode 131, and the second internal electrode 122*a*, the fourth internal electrode 124*a*, the first dummy electrode 121*b*, and the third dummy electrode 123*b* may not be connected to the first external electrode 131 but may be connected to the second external electrode 132. In this case, each of the first to fourth internal electrodes 121*a*, 122*a*, 123*a*, and 124*a*, and each of the first to fourth dummy electrodes 121*b*, 122*b*, 123*b*, and 124*b* may be electrically separated from each other by the dielectric layer 111 disposed therebetween in the first direction.

The body 110 may be formed by laminating a first ceramic green sheet on which the first internal electrode layer 121 is printed, a second ceramic green sheet on which the second internal electrode layer 122 is printed, a third ceramic green sheet on which the third internal electrode layer 123 is printed, and a fourth ceramic green sheet on which the fourth internal electrode layer 124 is printed, and firing the sheets.

The shapes of the dielectric layer, the fourth internal electrode 224*a* and the fourth dummy electrode 224*b* will be described in greater detail with reference to FIG. 4, which is a cross-section in the second and third directions, as an example, but an embodiment thereof is not limited thereto, and the description of the fourth internal electrode 224*a* may be applied to the first to fourth internal electrodes 121*a*, 122*a*, 123*a*, and 124*a*, 221*a*, 222*a*, 223*a*, and 224*a*, and the description of the fourth dummy electrode 224*b* may be applied to the first to fourth dummy electrodes 121*b*, 122*b*, 123*b*, and 124*b*, 221*b*, 222*b*, 223*b*, and 224*b*.

A size, in the second direction, of the dielectric layer 111 may be defined as L, and the third direction size may be defined as W.

The fourth internal electrode 224*a* may include first to fourth sides and may be exposed through the fourth surface 4. A size, in the second direction, of the first side of the fourth internal electrode 224*a*, adjacent to the fifth surface 5, may be defined as L1, a size, in the second direction, of the second side adjacent to the sixth surface 6 may be defined as L2, and the size, in the third direction, of the third side in contact with the fourth surface 4 may be defined as W1, and the length of the fourth side may be determined by the first to third sides.

Here, L1 and L2 may satisfy $0.35\times L<L1\leq 0.98\times L$ and $0.14\times L1\leq L2\leq 0.94\times L1$ to form sufficient capacitance, and W1 may satisfy $0.42\times W\leq W1\leq 0.94\times W$ to form electrical connection with the second external electrode and sufficient capacitance.

Also, the first side of the fourth internal electrode 224*a* may be spaced apart from the fifth surface 5 by W3 in the third direction, and the second side of the fourth internal electrode 224*a* may be spaced apart from the sixth surface 6 by W4 in the third direction.

Here, W3 and W4 may satisfy $0.03\times W\leq W3\leq 0.29\times W$ and $0.03\times W\leq W4\leq 0.29\times W$, and W3 may have the same size as W4, but may not be limited thereto.

The fourth dummy electrode 224*b* may include first to fourth sides and may be exposed through the third surface 3. A size, in the second direction, of the first side of the fourth dummy electrode 224*b*, in contact with or adjacent to the fifth surface 5, may be defined as L3, a size, in the second direction, of the second side adjacent to the sixth surface 6 may be defined as L5, and the size of the third direction of the third side in contact with the third surface 3 may be defined as W2, and the length of the other fourth side may be determined by the first to third sides.

Here, L3 and L5 may satisfy $0\leq L3\leq 0.22\times L$ and $L5=L-L4-L2$ to assure sufficient warpage strength, and W2 may satisfy $W1\leq W2\leq 0.97\times W$ to assure sufficient warpage strength.

The size, in the second direction, of the fourth spacing portion 144 may be defined as L4 and may satisfy 15 $\mu m\leq L4\leq 200$ μm, and the size, in the second direction, of the fourth spacing portion 144 may be substantially constant.

As the size L4, in the second direction, of each of the first to fourth spacing portions 141, 142, 143, and 144 satisfies 15 $\mu m\leq L4\leq 200$ μm, warpage strength of the multilayer electronic component may be improved.

When the size L4, in the second direction, of each of the first to fourth spacing portion 141, 142, 143, and 144 is less than 15 μm, the internal electrode and the dummy electrode may not be electrically insulated from each other, which may cause a short, and when the size L4, in the second direction, of each of the first to fourth spacing portions 141, 142, 143, and 144 exceeds 200 μm, warpage strength of the multilayer electronic component may not be improved, which may cause cracks.

When the angle formed by the first side and the fourth side in the fourth internal electrode 224*a* is defined as θ1, $30°\leq\theta1\leq 80°$ may be satisfied for sufficient warpage strength of the multilayer electronic component.

Also, when the angle formed by the second and fourth sides in the fourth dummy electrode 224*b* is defined as θ2, $30°\leq\theta2\leq 80°$ may be satisfied for sufficient warpage strength of the multilayer electronic component.

In some embodiments, s may be substantially the same.

The material for forming the internal electrode layers 121, 122, 123, and 124 is not limited to any particular example, and a material having excellent electrical conductivity may be used. For example, the internal electrode layers 121, 122, 123, and 124 may include one or more of nickel (Ni), copper (Cu), palladium (Pd), silver (Ag), gold (Au), platinum (Pt), tin (Sn), tungsten (W), titanium (Ti), and alloys thereof.

Also, the internal electrode layers 121, 122, 123, and 124 may be formed by printing conductive paste for forming an internal electrode including one or more of nickel (Ni), copper (Cu), palladium (Pd), silver (Ag), gold (Au), platinum (Pt), tin (Sn), tungsten (W), titanium (Ti), and alloys thereof on a ceramic green sheet. As a method of printing conductive paste for an internal electrode, a screen printing method or a gravure printing method may be used, but an embodiment thereof is not limited thereto.

The thickness te of the internal electrode layers 121, 122, 123, and 124 may not be limited to any particular example.

To ensure reliability of the multilayer electronic component 100 in a high voltage environment, the thickness te of each of the internal electrode layers 121, 122, 123, and 124 may be 3.0 μm or less. Also, to implement miniaturization and high capacitance of the multilayer electronic component 100, the thickness of each of the internal electrode layers 121, 122, 123, and 124 may be 1.0 μm or less, and to easily implement ultra-miniaturization and high capacitance, the thickness of each of the internal electrode layers 121, 122, 123, and 124 may be 0.6 μm or less, and more preferably 0.4 μm or less.

Here, the thicknesses of the internal electrode layers 121, 122, 123, and 124 may indicate the sizes of the internal electrodes 121, 122, 123, and 124 in the first direction, respectively. Also, the thicknesses te of the internal electrode layers 121, 122, 123, and 124 may indicate the average thicknesses te of the internal electrode layers 121, 122, 123, and 124, respectively, and may indicate the average sizes of the internal electrode layers 121, 122, 123, and 124 in the first direction, respectively.

The average size, in the first direction, of each of the internal electrode layers 121, 122, 123, and 124 may be measured by scanning a cross-section of the body 110 using a scanning electron microscope (SEM) with a magnification of 10,000. More specifically, an average value may be measured from the sizes in the first direction of the internal electrode at five points at an equal distance in the second direction in the scanned image, and the average size, in the first direction, of a dummy electrode may be obtained by measuring the size, in the first direction, at five points at an equal interval in the second direction. Afterwards, the average size, in the first direction, of the internal electrode layer may be obtained by averaging the average size, in the first direction, of the internal electrode and the average size, in the first direction, of the dummy electrode. Also, by extending the measurement of the average value to 10 internal electrodes, the average size of the internal electrode layers 121, 122, 123, and 124 may be further generalized.

Here, the average size, in the first direction, of the internal electrode and the average size, in the first direction, of the dummy electrode may be substantially the same, but an embodiment thereof is not limited thereto. Here, the configuration in which the average size, in the first direction, of the internal electrode and the average size, in the first direction, of the dummy electrode are substantially the same may indicate that the difference between the large value and the small value is less than 5%.

In an embodiment, the average thickness td of at least one of the plurality of dielectric layers 111 and the average thickness te of at least one of the plurality of the internal electrode layers 121, 122, 123, and 124 may satisfy $2\times te<td$.

In other words, the average thickness td of the dielectric layer 111 may be greater than twice the average thickness te of one of the internal electrode layers 121, 122, 123, and 124. Preferably, the average thickness td of the plurality of dielectric layers 111 may be greater than twice the average thickness te of the plurality of the internal electrode layers 121, 122, 123, and 124.

Each of the lengths, sizes, and angles disclosed herein may be measured by a scanning electron microscope (SEM).

The average size, in the second direction, of each of the spacing portions may be obtained by taking an average of sizes measured at different points. Other methods and/or tools appreciated by one of ordinary skill in the art, even if not described in the present disclosure, may also be used.

Generally, a high-voltage electronic component may have an issue in reliability due to a decrease in breakdown voltage (BDV) in a high-voltage environment.

Accordingly, to prevent a decrease in breakdown voltage under a high voltage environment, by configuring the average thickness td of the dielectric layer 111 to be larger than twice the average thickness te of the internal electrode layers 121, 122, 123, and 124, the thickness of the dielectric layer, which is the distance between the internal electrodes, may be increased and breakdown voltage properties may be improved.

When the average thickness td of the dielectric layer 111 is less than twice the average thickness te of the internal electrode layers 121, 122, 123, and 124, the average thickness of the dielectric layer, which is the distance between the internal electrodes, may be reduced such that the breakdown voltage may decrease, and a short may occur between the internal electrodes.

The body 110 may include cover portions 112 and 113 disposed on both end-surfaces in the first direction of the capacitance forming portion Ac.

More specifically, the body 110 may include a first cover portion 112 disposed on one surface in the first direction of the capacitance formation portion Ac and a second cover portion 113 disposed on the other surface in the first direction of the capacitance formation portion Ac. More specifically, the body 110 may include the upper cover portion 112 disposed in the upper portion in the first direction of the capacitance formation portion Ac and the lower cover portions 113 disposed in the lower portion in the first direction of the capacitance formation portion Ac.

The upper cover portion 112 and the lower cover portion 113 may be formed by laminating a single dielectric layer 111 or two or more dielectric layers 111 on the upper and lower surfaces of the capacitance forming portion Ac in the first direction, and may prevent damages to the internal electrode layers 121, 122, 123, and 124 due to physical or chemical stress.

The upper cover portion 112 and the lower cover portion 113 may not include the internal electrode layers 121, 122, 123, and 124 and may include the same material as that of the dielectric layer 111. That is, the upper cover portion 112 and the lower cover portion 113 may include a ceramic material, for example, a barium titanate ($BaTiO_3$) ceramic material.

The thickness tc of the cover portion 112 and 113 may not be limited to any particular example.

However, to easily implement miniaturization and high capacitance of multilayer electronic components, the thickness tc of the cover portions 112 and 113 may be 100 μm or less, preferably 30 μm or less. More preferably, the thickness may be 20 μm or less in an ultra-small product.

Here, the thickness tc of the cover portion 112 or 113 may refer to the size, in the first direction, of the cover portion 112 or 113. Also, the thickness tc of the cover portions 112 and 113 may refer to the average thickness tc of the cover portions 112 and 113, and may refer to the average size, in the first direction, of the cover portions 112 and 113.

The average size of the cover portions 112 and 113 may be measured by scanning a cross-section in the first and second directions of the body 110 using a scanning electron microscope (SEM) at a magnification of 10,000. More specifically, the average size may indicate the average value calculated by measuring the sizes in the first direction at 10 points at an equal distance in the second direction in the scanned image of the cover portion.

Also, the average size, in the first direction, of the cover portion measured by the above method may be substantially the same as the average size, in the first direction, of the cover portion in the cross-section in the first and third directions of the body 110.

The body 110 may include side margin portions 114 and 115 disposed between the body 110 and both sides in the third direction of the internal electrode layers 121, 122, 123, and 124.

More specifically, the side margin portions 114 and 115 may include the first side margin portion 114 disposed on the fifth surface 5 of the body 110 and one side in the third direction of the internal electrode layers 121, 122, 123, and 124, and the second side margin portion 115 disposed in at least a portion between the sixth surface 6 of body 110 and the third direction one side of the internal electrode layers 121, 122, 123, and 124.

However, an embodiment thereof is not limited thereto, and when the dummy electrodes **221*b*, 222*b*, 223*b*, and 224*b* are in contact with a portion of one of the fifth and sixth surfaces 5 and 6 of the body 110, other than this region, the region disposed between the body 110 and both third sides in the third direction of the internal electrode layers 221, 222, 223, and 224** may be referred to as the side margin portion.

For example, the side margin portions 114 and 115 may indicate the side margin region between the fifth and sixth surfaces 5 and 6 of the body and both sides of the internal electrodes **121*a*, 122*a*, 123*a*, and 124*a***.

More specifically, the region between the first internal electrode **121*a* and the fifth surface 5 may be referred to as the first side margin region of the first internal electrode, the region between the first internal electrode 121*a* and the sixth surface 6 may be referred to as the second side margin region of the first internal electrode, the region between the second internal electrode 122*a* and the fifth surface 5 may be referred to as the first side margin region of the second internal electrode, the region between the second internal electrode 122*a* and the sixth surface 6 may be referred to as the second side margin region of the second internal electrode, the region between the third internal electrode 123*a* and the fifth surface 5 may be referred to as the first side margin region of the third internal electrode, the region between the third internal electrode 123*a* and the sixth surface 6 may be referred to as the second side margin region of the third internal electrode, the region between the fourth internal electrode 124*a* and the fifth surface 5 may be referred to as the first side margin region of the fourth internal electrode, and the region between the fourth internal electrode 124*a* and the sixth surface 6** may be referred to as the second side margin region of the fourth internal electrode.

The side margin portions 114 and 115 may prevent damages to the internal electrode layers 121, 122, 123, and 124 due to physical or chemical stress.

In an embodiment, the multilayer electronic component 100 may have two external electrodes 131 and 132, but the number of the external electrodes 131 and 132 or the shape thereof may be varied depending on the forms of the internal electrode layers 121, 122, 123, and 124 or other purposes.

The external electrodes 131 and 132 may be disposed on the body 110 and may be connected to the internal electrode layers 121, 122, 123, and 124.

More specifically, the first external electrode 131 may be disposed on the third surface 3 of the body 110 and may be connected to the first internal electrode 121*a*, the third internal electrode 123*a*, the second dummy electrode 122*b* and the fourth dummy electrode 124*b*, and the second external electrode 132 may be disposed on the fourth surface 4 of the body 110 and may be connected to the second internal electrode 122*a*, the fourth internal electrode 124*a*, the first dummy electrode 121*b*, and the third dummy electrode 123*b*.

Also, the external electrodes 131 and 132 may extend to and be disposed on a portion of the first and second surfaces 1 and 2 of the body 110, or may extend to and be disposed on a portion of the fifth and sixth surfaces 5 and 6 of the body 110. That is, the first external electrode 131 may be disposed on a portion of the first, second, fifth, and sixth surfaces 1, 2, 5, and 6 of the body 110, and the third surface 3 of the body 110, and the second external electrode 132 may be disposed on a portion of the first, second, fifth, and sixth surfaces 1, 2, 5, and 6 of the body 110, and the third surface 3 of the body 110.

When the dummy electrodes 221*b*, 222*b*, 223*b*, and 224*b* are disposed to be in contact with a portion of one of the fifth and sixth surfaces 5 and 6 of the body, the external electrodes 231 and 232 may be disposed to cover the dummy electrodes 221*b*, 222*b*, 223*b*, and 224*b*.

For example, when the first dummy electrode 221*b* is in contact with a portion of the fifth surface 5, a size, in the second direction, of the second external electrode 232, in contact with a portion of the fifth surface 5, may be larger than the size, in the second direction, in contact with a portion of the fifth surface 5 of the first dummy electrode 221*b*. When the second dummy electrode 222*b* is in contact with a portion of the sixth surface 6 of the first external electrode 231, the size, in the second direction, of the first external electrode 231, in contact with a portion of the sixth surface 6, may be larger than the size, in the second direction, in contact with a portion of the sixth surface 6 of the second dummy electrode 222*b*. When the third dummy electrode 223*b* is in contact with a portion of the sixth surface 6, a size, in the second direction, of the second external electrode 232, in contact with a portion of the sixth surface 6, may be larger than the size, in the second direction, in contact with a portion of the sixth surface 6 of the third dummy electrode 223*b*. When the fourth dummy electrode 224*b* is in contact with a portion of the fifth surface 5, a size, in the second direction, of the first external electrode 231, in contact with a portion of the fifth surface 5, may be larger than the size, in the second direction, in contact with a portion of the fifth surface 5 of the fourth dummy electrode 224*b*.

Even when the first to fourth dummy electrodes 221*b*, 222*b*, 223*b*, and 224*b* are disposed to be in contact with a portion of one of the fifth and sixth surfaces and are exposed to one of the fifth and sixth surfaces, the first and second external electrodes 231 and 232 may cover the electrodes, such that external moisture permeation may be prevented and moisture resistance reliability may be improved.

The external electrodes 131 and 132 may be formed of any material having electrical conductivity, such as metal, and a specific material may be determined in consideration of electrical properties and structural stability, and the external electrodes 131 and 132 may have a multilayer structure.

For example, the external electrodes 131 and 132 may include an electrode layer disposed on the body 110 and a plating layer disposed on the electrode layer.

For a more specific example of the electrode layer, the electrode layer may include first electrode layers 131*a* and 132*a*, which may be fired electrodes including a first conductive metal and glass, or second electrode layers 131*b* and 132*b*, which may be resin-based electrodes including second conductive metal and resin.

Here, the conductive metal included in the first electrode layers 131*a* and 132*a* may be referred to as a first conductive metal, and the conductive metal included in the second electrode layers 131*b* and 132*b* may be referred to as a second conductive metal. In this case, the first conductive metal and the second conductive metal may be the same or different from each other, and when a plurality of conductive metals are included, only a portion thereof may include the same conductive metal, but an embodiment thereof is not limited.

Also, the electrode layer may be formed by forming a fired electrode and a resin-based electrode on the body 110 in order.

Also, the electrode layer may be formed by transferring a sheet including a conductive metal onto the body, or may be formed by transferring a sheet including a conductive metal onto the fired electrode.

A material having excellent electrical conductivity may be used as a conductive metal included in the electrode layers 131*a*, 132*a*, 131*b*, and 132*b*. For example, the conductive metal may include one or more selected from a group consisting of nickel (Ni), copper (Cu), palladium (Pd), silver (Ag), gold (Au), platinum (Pt), tin (Sn), tungsten (W), titanium (Ti) and alloys thereof, but an embodiment thereof is not limited thereto.

In an embodiment, the electrode layers 131*a*, 132*a*, 131*b*, and 132*b* may have a two-layer structure including the first electrode layers 131*a* and 132*a* and the second electrode layers 131*b* and 132*b*, and accordingly, the external electrodes 131 and 132 may include first electrode layers 131*a* and 132*a* including a first conductive metal and glass, and second electrode layers 131*b* and 132*b* disposed on the first electrode layers 131*a* and 132*a* and including a second conductive metal and resin.

The first electrode layers 131*a* and 132*a* may improve bondability with the body 110 by including glass, and the second electrode layers 131*b* and 132*b* may improve warpage strength by including resin.

The first conductive metal included in the first electrode layers 131*a* and 132*a* is not limited to any particular example as long as the material may be electrically connected to the internal electrode layers 121, 122, 123, and 124 to form capacitance, and for example, the first conductive metal may include one or more selected from a group consisting of nickel (Ni), copper (Cu), palladium (Pd), silver (Ag), gold (Au), platinum (Pt), tin (Sn), tungsten (W), titanium (Ti) and alloys thereof.

The first electrode layers 131*a* and 132*a* may be formed by applying a conductive paste prepared by adding glass frit to the first conductive metal particles and firing the paste.

The second conductive metal included in the second electrode layers 131*b* and 132*b* may allow the layers to be electrically connected to the first electrode layers 131*a* and 132*a*.

The conductive metal included in the second electrode layers 131*b* and 132*b* is not limited to any particular example as long as the material may be electrically connected to the electrode layers 131*a* and 132*a*, and may include one or more selected from a group consisting of nickel (Ni), copper (Cu), palladium (Pd), silver (Ag), gold (Au), platinum (Pt), tin (Sn), tungsten (W), titanium (Ti) and alloys thereof.

The second conductive metal included in the second electrode layers 131*b* and 132*b* may include one or more of spherical particles and flake-type particles. In other words, the conductive metal may only include flake-type particles, only spherical particles, or may be a mixture of flake-type particles and spherical particles. Here, spherical particles may include shapes not completely spherical, for example, shapes in which the length ratio (major axis/minor axis) between the major axis and the minor axis is 1.45 or higher. Flake-type particles may refer to particles having a flat and elongated shape, and are not limited to any particular example, and for example, a length ratio of the major axis between the minor axis (major axis/minor axis) may be 1.95 or more. The length of the major axis and the minor axis of the spherical particles and the flake-type particles may be measured from an image obtained by scanning the cross-sections in first and second direction of the central portion in the third direction of the multilayer electronic component using a scanning electron microscope (SEM).

The resin included in the second electrode layers 131*b* and 132*b* may secure bondability and may absorb impacts. The resin included in the second electrode layers 131*b* and 132*b* is not limited to any particular example as long as the resin has bondability and impact absorption properties and may be mixed with second conductive metal particles to create a paste, and may include, for example, an epoxy resin Also, the second electrode layers 131*b* and 132*b* may include a plurality of metal particles, an intermetallic compound and resin. By including an intermetallic compound, electrical connectivity with the first electrode layers 131*a* and 132*a* may be improved. The intermetallic compound may improve electrical connectivity by connecting a plurality of metal particles to each other, and may surround a plurality of metal particles and may connect the metal particles to each other.

In this case, the intermetallic compound may include a metal having a melting point lower than a curing temperature of resin. That is, as the intermetallic compound may include a metal having a melting point lower than the curing temperature of resin, the metal having a melting point lower than the curing temperature of the resin may melt during a drying and curing process, may form an intermetallic compound with a portion of the metal particles and may surround the metal particles. In this case, the intermetallic compound may include a low melting point metal, preferably below 300° C.

For example, Sn having a melting point of 213-220° C. may be included. During the drying and hardening process, Sn may be melted, and the melted Sn may wet metal particles at high melting points such as Ag, Ni, or Cu by capillary action, may react with a portion of Ag, Ni or Cu metal particles and may form intermetallic compounds such as $Ag_3Sn$, $Ni_3Sn_4$, $Cu_6Sn_5$, or $Cu_3Sn$. Ag, Ni or Cu not participating in the reaction may remain in the form of metal particles.

Accordingly, the plurality of metal particles may include one or more of Ag, Ni and Cu, and the intermetallic compound may include one or more of $Ag_3Sn$, $Ni_3Sn_4$, $Cu_6Sn_5$ and $Cu_3Sn$.

The plating layers 131*c* and 132*c* may improve mounting properties.

The type of the plating layers 131*c* and 132*c* is not limited to any particular example, and the plating layers 131*c* and 132*c* may be single-layer plating layers 131*c* and 132*c* including at least one of nickel (Ni), tin (Sn), palladium (Pd), and alloys thereof, and may be formed in a plurality of layers.

For a more specific example of the plating layers 131*c* and 132*c*, the plating layers 131*c* and 132*c* may be Ni plating layers or Sn plating layers, and Ni plating layers and Sn plating layers may be formed in order on the electrode layers, and a Sn plating layer, a Ni plating layer, and a Sn plating layer may be formed in order. Also, the plating layers 131*c* and 132*c* may include a plurality of Ni plating layers and/or a plurality of Sn plating layers.

The size of the multilayer electronic component 100 may not be limited to any particular example.

However, to implement both miniaturization and high capacitance, the number of laminates may need to be increased by reducing the thickness of the dielectric layer and the internal electrode, such that the effect described in the embodiments may be noticeable in the multilayer electronic component 100 having a size of 3216 (Length×Width: 3.2 mm×1.6 mm) or less.

According to the aforementioned embodiments, warpage strength of the multilayer electronic component may be improved.

The embodiments do not necessarily limit the scope of the embodiments to a specific embodiment form. Instead, modifications, equivalents and replacements included in the disclosed concept and technical scope of this description may be employed. Throughout the specification, similar reference numerals are used for similar elements.

In the embodiments, the term "embodiment" may not refer to one same embodiment, and may be provided to describe and emphasize different unique features of each embodiment. The suggested embodiments may be implemented do not exclude the possibilities of combination with features of other embodiments. For example, even though the features described in an embodiment are not described in the other embodiment, the description may be understood as relevant to the other embodiment unless otherwise indicated.

Terms used in the present specification are for explaining the embodiments rather than limiting the embodiments. Unless explicitly described to the contrary, a singular form may include a plural form in the present specification While the embodiments have been illustrated and described above, it will be configured as apparent to those skilled in the art that modifications and variations could be made without departing from the scope of the present disclosure as defined by the appended claims.

What is claimed is:

1. A multilayer electronic component, comprising:

a body including a dielectric layer and first to fourth internal electrode layers disposed alternately in a first direction with the dielectric layer interposed therebetween, the body including first and second surfaces opposing each other in the first direction, third and fourth surfaces connected to the first and second surfaces and opposing each other in a second direction, and fifth and sixth surfaces connected to the first to fourth surfaces and opposing each other in a third direction; and first and second external electrodes disposed on the third and fourth surfaces respectively, wherein the first internal electrode layer includes a first internal electrode, and a first dummy electrode spaced apart from the first internal electrode with a first spacing portion therebetween, the second internal electrode layer includes a second internal electrode, and a second dummy electrode spaced apart from the second internal electrode with a second spacing portion therebetween, the third internal electrode layer includes a third internal electrode, and a third dummy electrode spaced apart from the third internal electrode with a third spacing portion therebetween, and the fourth internal electrode layer includes a fourth internal electrode, and a fourth dummy electrode spaced apart from the fourth internal electrode with the fourth spacing portion therebetween, wherein the first external electrode is connected to the first internal electrode, the third internal electrode, the second dummy electrode and the fourth dummy electrode, and the second external electrode is connected to the second internal electrode, the fourth internal electrode, the first dummy electrode, and the third dummy electrode, and wherein the first spacing portion includes a region overlapping the third spacing portion in the first direction and a region not overlapping the third spacing portion, and the second spacing portion includes a region overlapping the fourth spacing portion in the first direction and a region not overlapping the fourth spacing portion.

2. The multilayer electronic component of claim 1, wherein each of the first to fourth internal electrodes includes first and second sides opposing each other in the third direction, and wherein a length of the first side of each of the first to fourth internal electrodes is different from a length of the second side of each of the first to fourth internal electrodes, respectively.

3. The multilayer electronic component of claim 1, wherein each of the first to fourth dummy electrodes includes first and second sides opposing each other in the third direction, and wherein a length of the first side of each of the first to fourth dummy electrodes is different from a length of the second side of each of the first to fourth dummy electrodes.

4. The multilayer electronic component of claim 1, wherein each of the first to fourth spacing portions has a substantially parallelogrammatic shape.

5. The multilayer electronic component of claim 1, wherein a size, in the second direction, of each of the first to fourth spacing portions is substantially constant.

6. The multilayer electronic component of claim 1, wherein an average size, in the second direction, of each of the first to fourth spacing portions is 15 μm or more and 200 μm or less.

7. The multilayer electronic component of claim 1, wherein the first to fourth internal electrodes are spaced apart from the fifth and sixth surfaces.

8. The multilayer electronic component of claim 1, wherein the first to fourth dummy electrodes are spaced apart from at least one of the fifth and sixth surfaces.

9. The multilayer electronic component of claim 1, wherein the first to fourth dummy electrodes are in contact with a portion of one of the fifth and sixth surfaces.

10. The multilayer electronic component of claim 9, wherein the first and fourth dummy electrodes are disposed to be in contact with a portion of the first surface, and the second and third dummy electrodes are disposed to be in contact with a portion of the sixth surface.

11. The multilayer electronic component of claim 10, wherein the first and second external electrodes are disposed to be in contact with portions of the fifth and sixth surfaces, respectively, wherein a size, in the second direction, of the first external electrode, in contact with a portion of the fifth surface, is larger than the size, in the second direction, of the fourth dummy electrode, in contact with a portion of the fifth surface, wherein a size, in the second direction, of the first external electrode, in contact with a portion of the sixth surface, is larger than a size, in the second direction, of the second dummy electrode, in contact with a portion of the sixth surface, wherein a size, in the second direction, of the second external electrode, in contact with a portion of the fifth surface, is larger than a size, in the second direction, of the first dummy electrode, in contact with a portion of the fifth surface, and wherein a size, in the second direction, of the second external electrode, in contact with a portion of the sixth surface, is larger than a size, in the second direction, of the third dummy electrode, in contact with a portion of the sixth surface.

12. The multilayer electronic component of claim 1, wherein each of the first to fourth internal electrodes includes an interior angle satisfying θ1, each of the first to fourth dummy electrodes includes an interior angle satisfying θ2, and θ1 and θ2 are each 30° or more and 80° or less.

13. The multilayer electronic component of claim 1, wherein an average size, in the second direction, of each of the first to fourth internal electrodes is larger than an average size, in the second direction, of each of the first to fourth dummy electrodes, respectively.

14. The multilayer electronic component of claim 1, wherein each of the first to fourth spacing portions is oblique to the fifth surface.

15. The multilayer electronic component of claim 12, wherein θ1 and θ2 are substantially the same.

16. The multilayer electronic component of claim 1, wherein the first and fourth dummy electrodes contact the fifth surface, and the second and third dummy electrodes contact the sixth surface.

* * * * *